United States Patent
Gei et al.

(10) Patent No.: US 9,906,434 B2
(45) Date of Patent: Feb. 27, 2018

(54) SMF-TYPE COMMUNICATION METHOD FOR A MANET NETWORK, NETWORK NODE AND MOBILE NETWORK WHICH IMPLEMENT THIS COMMUNICATION METHOD

(71) Applicant: SELEX ES S.p.A., Rome (IT)

(72) Inventors: Francesco Gei, Rome (IT); Niccolo Privitera, Rome (IT); Gabriele Tamea, Rome (IT)

(73) Assignee: SELEX ES S.P.A., Rome (IT)

( * ) Notice: Subject to any disclaimer, the term of this patent is extended or adjusted under 35 U.S.C. 154(b) by 0 days.

(21) Appl. No.: 14/784,012

(22) PCT Filed: Apr. 11, 2014

(86) PCT No.: PCT/IB2014/060665
§ 371 (c)(1),
(2) Date: Oct. 12, 2015

(87) PCT Pub. No.: WO2014/167549
PCT Pub. Date: Oct. 16, 2014

(65) Prior Publication Data
US 2016/0072699 A1    Mar. 10, 2016

(30) Foreign Application Priority Data

Apr. 12, 2013   (IT) .............................. TO2013A0297

(51) Int. Cl.
*H04L 12/761* (2013.01)
*H04L 12/733* (2013.01)
(Continued)

(52) U.S. Cl.
CPC ............ *H04L 45/16* (2013.01); *H04L 12/185* (2013.01); *H04L 45/20* (2013.01); *H04W 40/246* (2013.01);
(Continued)

(58) Field of Classification Search
CPC ......... H04L 45/16; H04L 45/20; H04L 45/26; H04L 12/185; H04W 40/246; H04W 40/26; H04W 84/18
(Continued)

(56) References Cited

U.S. PATENT DOCUMENTS 7,184,421 B1 *   2/2007   Liu .................... H04L 12/189
                                              370/254
7,580,380 B2 *   8/2009   Baker .................. H04W 84/18
                                              370/310
(Continued)

OTHER PUBLICATIONS

Macker J, et al. "Simplified Multicast Forwarding" InternetEngineering Taskforce, IETF, May 18, 2012, pp. 1-55.*
(Continued)

*Primary Examiner* — Afsar M Qureshi
(74) *Attorney, Agent, or Firm* — Vector IP Law Group; Robert S. Babayi (57) ABSTRACT

A communication method of the SMF type for a network of nodes including a multicast group. The method includes the steps, performed by a first node, of: determining a set of respective multipoint relays; determining the nodes for which the first node is a multipoint relay; determining a routing table including identifiers of destination nodes and corresponding identifiers of next-hop nodes; receiving a multicast packet sent from a sending node, where the first node is a multipoint relay; checking if, for each node identifier of the multicast group, the entry in the routing table that includes a destination node identifier corresponding to the node identifier of the multicast group contains a next-hop node identifier that corresponds to the sending node, and if the counter contained in the multicast packet respects a relation with a limit; and determining whether to retransmit the multicast packet, on the basis of the outcome of the checking step.

8 Claims, 4 Drawing Sheets

(51) Int. Cl.
   *H04L 12/18*   (2006.01)
   *H04W 40/24*   (2009.01)
   *H04W 40/26*   (2009.01)
   *H04L 12/721*   (2013.01)
   *H04W 84/18*   (2009.01)

(52) U.S. Cl.
   CPC ............. *H04L 45/26* (2013.01); *H04W 40/26* (2013.01); *H04W 84/18* (2013.01)

(58) Field of Classification Search
   USPC ........................................................ 370/254
   See application file for complete search history.

(56) References Cited

U.S. PATENT DOCUMENTS

| | | | | |
|---|---|---|---|---|
| 7,656,851 | B1* | 2/2010 | Ghanadan | H04W 40/26 370/256 |
| 8,064,377 | B2* | 11/2011 | Yi | H04L 12/1877 370/252 |
| 8,699,377 | B2* | 4/2014 | Veillette | H04L 45/34 370/254 |
| 8,873,391 | B2* | 10/2014 | Brown | H04L 45/32 370/231 |
| 9,288,066 | B2* | 3/2016 | Hui | H04L 12/18 |

OTHER PUBLICATIONS

Fabio A Bovino et al, "Practical Quantum Cryptography: the Q-KeyMaker", Apr. 13, 2011(Apr. 13, 2011), XP055126994, Retrieved from the Internet: URL: http // arxiv.org/abs/1104.2475[retrieved on Jul. 3, 2014].

Patent Cooperation Treaty International Search Report,PCT/IB2014/060665 ,dated Oct. 16, 2014.

Macker J et al, "Simplified Multicast Forwarding", Internet Engineering Task Force, IETF, May 18, 2012, pp. 1-55, subsection 5, subsection 9.2, Geneva Switzerland.

Clausen Thomas Heide, "Combining Temporal and Spatial Partial Topology for MANET Routing—Merging OLSR and FSR", International Symposium on Wireless Personal Multimedia Communications, Oct. 1, 2003, pp. 1-5, Yokosuka, Japan.

* cited by examiner

SMF-TYPE COMMUNICATION METHOD FOR A MANET NETWORK, NETWORK NODE AND MOBILE NETWORK WHICH IMPLEMENT THIS COMMUNICATION METHOD

CROSS REFERENCE TO RELATED APPLICATIONS

This application is filed under 35 U.S.C. 371 for national entry of PCT/IB2014/060665 dated Apr. 11, 2014. This application claims foreign priority to Italian application No. TO2013A000297 dated Apr. 12, 2013.

TECHNICAL FIELD

The present invention relates to a SMF-type communication method for a mobile ad hoc network (MANET). Furthermore, the present invention refers to a network node and a mobile network that implement this communication method.

BACKGROUND ART

As is known, a MANET network is a packet network formed by a plurality of nodes, which communicate with each other via ad hoc links. The nodes therefore cooperate with each other to correctly route packets by applying relay techniques of a multi-hop type.

In practice, MANET networks are generally characterized by the mobility of the nodes that form them, as well as by the absence of fixed infrastructures able to ensure communications between the nodes. Therefore, MANET networks are typically implemented inside extremely dynamic environments on an as-needed basis. For example, MANET networks are known that are employed in the automotive field, where they are also known as vehicular ad hoc networks (VANET).

Over time and on the basis of the typical characteristics of MANET networks, routing protocols have been proposed that are capable of ensuring communications between the nodes. For example, the so-called Optimized Link State Routing Protocol (OLSR protocol) is known, as defined by the Internet Engineering Task Force (IETF) and described, for example, at Internet address http://www.rfc-editor.org/rfc/rfc3626.txt.

An implementation of the OLSR protocol is described, for example, in "Optimized Link State Routing Protocol for Ad Hoc Networks", by P. Jacquet et al, Hipercom Project, INRIA Rocquencourt, BP 105, 78153 Le Chesnay Cedex, France.

The OLSR protocol is a proactive type of protocol, based on the exchange of control packets between the nodes, these packets being periodically transmitted in broadcast mode. In other words, when a generic node sends its control packet, it addresses this packet to all the other nodes of the network; consequently, all of the nodes visible to the generic node, i.e. capable of receiving the electromagnetic signals transmitted by the generic node, receive and process this packet. The broadcast transmission contemplates that the sent packet contains a specific address, also known as a broadcast address, known to all the nodes of the network.

In particular, the OLSR protocol is characterized by the fact that the control packets transmitted by the nodes are very small, as well as for the fact that only some nodes of the network retransmit, namely relay the received control packets, retransmission still taking place in broadcast mode.

In this regard, although each retransmission implies, at physical level, a transmission, in general one refers to the transmission or generation of a packet to indicate the first generation of the packet and the associated content by a first node, while one refers to the retransmission of the packet to indicate retransmission of the packet, which contemplates a modification to just the header of the packet, but not the data contained therein, the latter also being known as the message. In any case, while the verb "to retransmit" implies an effective retransmission, the verb "to transmit" can also be used to refer to the action of transmitting a packet during a retransmission, and so its use is not necessarily limited to the transmission of a packet by the first node that has generated the packet. Similarly, the verb "to send" is also used to refer to the action of transmitting or retransmitting a packet without distinction. Again, the action of generating a packet is also known as originating a packet, while the action of communicating a packet to a node disregards the fact of whether the node is near or far, ad so disregards the fact of whether the communication takes place in a direct or indirect manner.

In the event of link faults or interruptions, the OLSR protocol does not generate any additional traffic with respect to the already mentioned control packets. In addition, the OLSR protocol works in a completely distributed manner and does not need any central entity. In addition, the OLSR protocol does not require that the control packets are received by the nodes in exactly the same order of transmission; this is due to the fact that each node signs its control messages with a progressive sequence identifier.

In detail, each node selects, from its neighbours, or rather the nodes that are just one hop away from it, a set of multipoint relays. In general, the proximity of two nodes does not implicate the existence of a bidirectional link between them, but implies the presence of a link that is at least one-way, and therefore implies that at least one of these two nodes is able to directly receive packets sent by the other node, without the packets having to be retransmitted by a third node. That having been said, considering one node, only the neighbouring nodes of the node considered and connected to it by bidirectional links can be selected as multipoint relays of the node considered.

Referring to a generic node N, and indicating the corresponding set of multipoint relays as MPR(N), each node of the MPR(N) set, when it receives a control packet transmitted by node N, reads and processes the control packet, and subsequently retransmits the control packet, still in broadcast mode. Conversely, the neighbouring nodes of node N that do not belong to the MPR(N) set, read and process the control packets sent by node N, but do not retransmit them. Each node of the MANET network stores and then updates a list of so-called MPR selectors. In particular, with reference, for example, still to node N, its list of MPR selectors is formed by nodes that are neighbours to it and that have selected it as their multipoint relay.

Given, for example, still node N, the selection of the set of multipoint relays takes place such that all the nodes that are two hops away from node N are connected to it via the multipoint relays, where a connection is intended as being over a bidirectional link. Therefore, the union of nodes neighbouring the multipoint relays contains all the nodes that are two hops away from node N. The smaller the cardinality of the set of multipoint relays, the better the operation of the OLSR protocol.

More in particular, given, for example, still node N, the selection of the set of multipoint relays takes place based on the so-called "willingness" parameter, which indicates a sort of disposition that each one of the neighbouring nodes of node N has to becoming a multipoint relay. A procedure for the selection of the multipoint relays based on willingness is described in "Request For Comments" (RFC) 3626 of the Internet Engineering Task Force. This procedure envisages that each node sets its own willingness to an integer value between zero and seven and that it communicates the set value to the other nodes, through so-called HELLO packets. Furthermore, still with reference to node N, the selection of its multipoint relays takes place in way that the nodes neighbouring it and having a willingness of seven are definitely selected as multipoint relays, and the nodes neighbouring it and having a willingness of zero are not selected as multipoint relays; the neighbouring nodes of node N that have a willingness of between one and six are instead selected with a priority proportional to the willingness value that has been set, until the set of multipoint relays is completed.

The control packets include the aforementioned HELLO packets, which, unlike other control packets, are not retransmitted by any node of the MANET network, not even by the multipoint relays.

In particular, again given node N, this periodically transmits its own HELLO packets. Each HELLO packet contains a control header, which comprises the address of the node that has transmitted the HELLO packet. In addition, each HELLO packet contains:
  a list of the addresses of the neighbouring nodes of node N and connected to node N via bidirectional links;
  a list of the addresses of the neighbouring nodes of node N, which have been heard by node N, i.e. to which node N is connected via a one-way links;
  a list of the multipoint relays of node N; and
  a sequence number associated with the HELLO packet.

For completeness, the aforementioned lists present in the HELLO packet can be partial, provided that all the neighbouring nodes are indicated in HELLO packets transmitted within a given time interval by the node N. Furthermore, three different indications are used to indicate the state of the links, which respectively correspond to one-way, bidirectional and multipoint relay. In addition, to check a link with any neighbouring node Y as being bidirectional, node N detects the possible reception of a HELLO packet sent by node Y and containing the address of node N.

Each node is therefore able to determine, on the basis of the HELLO packets it receives, its own MPR selectors, the addresses of which are stored in a table of MPR selectors.

Each node, on the basis of the HELLO packets it receives, is able to have knowledge of the links with nodes that are up to two hops away. In particular, again with reference to node N, this is able to maintain a neighbour table, in which it stores a plurality of entries, each entry containing the address of a corresponding node that is one hop away (neighbouring node), as well as the state of the connection with that neighbouring node and a list of the addresses of the nodes that are two hops away from node N and which are neighbours of this neighbouring node. The neighbour table also contains a sequence number, which indicates the most recent set of multipoint relays selected by node N. Each time that node N communicates its set of multipoint relays (as described hereinafter) to the other nodes, it also increments this sequence number. Furthermore, all the entries of the neighbour table are associated with corresponding holding times, the expiry of which results in the entries being deleted.

Each node is therefore able to select, on the basis of its own neighbour table, its own set of multipoint relays, such that it satisfies the previously mentioned requirements. This set of multipoint relays will be communicated in subsequent HELLO packets that will be transmitted. In particular, selection of the set of multipoint relays for node N is carried out each time node N detects a change in its neighbouring nodes, due, for example, to a fault on a bidirectional link, or the addition of a bidirectional link with a new node; furthermore, node N performs a new selection each time it detects a change in the nodes two hops away from it and which are connected to it through bidirectional links. Therefore, each node updates its own multipoint relays on every reception of a HELLO packet.

In greater detail, at a time $t_1$, the union of the nodes neighbouring the multipoint relays of node N contains all the nodes that are two hops away from node N, assuming that the information contained in the neighbour table of node N corresponds to the links present at time $t_1$ between node N and the nodes that are up to two hops away from node N. In other words, the information contained in the neighbour table are at the most related to a time $t_0$, prior to time $t_1$, when it is possible that the aforementioned statement regarding the union of the neighbouring nodes is temporarily untrue, due, for example, to the approach of node unknown to node N. In any case, the aforementioned statement becomes true in steady state, or when, still given node N for example, the changes in the respective set of its neighbouring nodes are slow with respect to the times with which the nodes transmit the HELLO packets.

Still with reference to the MPR selector table, the addresses of the MPR selectors contained therein are associated with corresponding sequence numbers, which are equal to the sequence numbers stored precisely by the MPR selectors and communicated by means of the HELLO packets. Furthermore, the entire MPR selector table is associated with a corresponding MPR selector table sequence number, which is equal to the most recent sequence number associated with a HELLO message that has been received and which has caused a change in the MPR selector table.

The control packets further comprise so-called topology control (TC) packets, which are periodically transmitted by the multipoint relays in broadcast mode.

Still with reference, by way of example, to node N, each TC packet that it transmits contains:
  the address of the node that originated it;
  the set of its MPR selectors; and
  the MPR selector table sequence number, which is precisely associated with its own MPR selector table.

In particular, the list of MPR selectors contained in the TC packet can be partial, provided that the complete list is sent, via two or more TC packets, within a certain refresh period. Furthermore, the time interval between the transmission of two successive TC packets depends on the fact of whether or not the MPR selector table is modified. For example, in the case of MPR selector table modification, node N can transmit a new TC packet as soon as a minimum period after sending the previous TC packet has lapsed; subsequent TC packets can then be transmitted with a given periodicity, until a new change to the MPR selector table takes place.

On the basis of the TC packets received, the nodes build and update their own topology tables, in which they store information regarding the multipoint relays of the other nodes. In particular, still assuming to refer to node N, its topology table comprises one or more entries, each entry comprising:
  an address of a possible destination, namely the address of a MPR selector contained in a TC packet received by node N;

a last-hop address related to the aforementioned possible destination, which is equal to the address of the node that has sent the aforementioned TC packet received by node N;

the corresponding MPR selector table sequence number of the node that has sent the aforementioned TC packet received by node N; and a corresponding holding time, after which the entry is deleted.

In practice, the presence, inside the topology table, of an entry related to a given node indicates the possibility of reaching the given node by sending a packet to the node whose address is equal to the last-hop address contained in the entry. However, it should be noted that there could be several entries inside the topology table having a same possible destination address, but with different last-hop addresses.

More in particular, upon reception of a TC packet sent by a sending node, node N (for example) performs the following operations:

checks whether there is an entry in its topology table in which the last-hop address is equal to the address of the sending node and, if so, whether the MPR selector table sequence number contained in this entry is greater than the MPR selector table sequence number contained in the TC packet received, in which case the TC packet is rejected without any further processing;

in the case where the aforementioned entry exists, if its last-hop address is equal to the address of the sending node and the MPR selector table sequence number contained in this entry is less than the MPR selector table sequence number contained in the TC packet received, this entry is deleted;

for each MPR selector address indicated in the TC packet received, node N checks whether a destination is present in its topology table that has an address equal to the MPR selector address considered, and whether the corresponding last-hop address is equal to the address of the sending node, in which case the corresponding holding time is reset to an initial (predetermined) value; in all other cases, node N creates a new entry in its topology table, which corresponds to the MPR selector address considered.

Each one of the nodes of the MANET network also maintains its own routing table, which is built and updated on the basis of the TC packets received, and more particularly on the basis of the topology table. The routing table stores information regarding the paths, i.e. the sets of successive and connected links that enable reaching the corresponding destinations.

Still making reference, for example, to node N, its routing table comprises one or more entries, each of which includes:

an address of a corresponding destination;

a next-hop address, namely the address of a neighbouring node of node N, to which it is necessary to send a packet, if this packet is destined to the node having an address equal to the aforementioned address of a corresponding destination, which is also referred to as the destination node; and a distance estimate, or rather an estimate of the number of hops to reach the destination node.

In practice, there is a bidirectional path between the node N and the destination node that passes through the node having an address equal to the next-hop address.

Each time node N receives a TC packet, for each destination address contained therein, it stores/updates a corresponding [last-hop, node] pair, which is actually formed from the destination address ([node]) and the address of the node that has sent the TC packet ([last-hop]). On the basis of the [last-hop, node] pairs, which are also referred to as connected pairs, node N determines, given a destination node, the corresponding path for reaching it. To this end, given for example a destination node R, node N searches for a connected pair [X,R], and successively for a connected pair [Z,X], and so on, until it finds a node K that is part of the MPR(N) set of multipoint relays of node N. The next-hop address related to the entry regarding destination R contained in the routing table of node N is thus equal to the address of node K.

Node N recalculates its routing table each time it detects a change in its neighbour and topology tables.

In greater detail, to calculate (or recalculate) the routing table, node N can execute the following algorithm.

Initially, all the entries possibly present in the routing table are deleted. Then, the new entries are stored, starting from those that have neighbouring nodes of node N as destinations. In particular, in the case where these neighbouring nodes are connected to node N in bidirectional mode, the corresponding entries contain destination and next-hop addresses that are the same, as well as having distance estimates equal to one.

Then, entries regarding nodes that are distanced from node N by distances h+1, where h=1, are stored.

In particular, node N stores a corresponding entry for each entry in the topology table that i) includes a destination address that does not correspond to the destination address of any of the entries present in the routing table, and ii) the last-hop address of which corresponds to the destination address of an entry in the routing table with a distance estimate equal to h. This corresponding entry contains a destination address equal to the destination address of the entry in the topology table, and a next-hop address equal to the next-hop address of the entry in the routing table, the destination address of which is equal to the aforementioned last-hop address.

Then, node N sets h=h+1 and repeats the previously specified operations. In this way, node N arrives at determining its own routing table.

With regard to data traffic, the OLSR protocol is of the so-called unicast type, i.e. provision is made that, if a node, for example node N, needs to transmit a data packet to another node W, this node transmits the data packet to the node (for example, G) whose address is equal to the next-hop address contained in the entry in the routing table having a destination address that coincides with the address of the node W. To this end, node N inserts both the address of node W and the address of node G in the data packet, these still being referred to, respectively, as the destination address and the next-hop address. Furthermore, since node N originates the data packet, it inserts its own address in the data packet, which is also referred to as the source address; this last address, like the destination address, is not modified during the course of the retransmissions. In general, reference is made to the transmission (or retransmission) of the data packet from node N to node G to indicate that the packet is transmitted (or retransmitted) from node N and contains the address of node G as the next-hop address, and therefore it is physically received by all the neighbouring nodes of node N, but all the neighbouring nodes of node N, except node G, reject the data packet, or in any case, according to the multiple access technique adopted, are unable to interpret the data packet.

The data packet is then received by all the neighbouring nodes of node N, but only node G processes the data packet and retransmits it to the node (for example, L) the address of which is equal to the next-hop address contained in the entry of the routing table of node G having a destination address that coincides with the address of the node W. The procedure is then repeated, until the data packet is received by node W.

Still with reference to the data traffic, according to the OLSR protocol, a node may transmit a data packet to a neighbouring node only if it is connected to the latter through a bidirectional link.

That having been said, there are other known types of protocol, such as, for example, the so-called Simple Multicast Forwarding Protocol (SMF protocol), defined by the Internet Engineering Task Force and described, for example, in the so-called fourteenth version at Internet address http://tools.ietf.org/html/draft-ieft-manet-smf.14.

For the distribution of data traffic, the SMF protocol makes use of the same signalling distribution employed by the OLSR protocol. In other words, in accordance with the SMF protocol, the data packets are transmitted in broadcast mode in the same way as the TC packets in the OLSR protocol. Therefore, the SMF protocol also contemplates, among other things, the determination of multipoint relays.

In detail, still referring to node N, this transmits its own data packets in broadcast mode. In addition, given any node of the MPR(N) set, when it receives a data packet transmitted from node N, it reads and processes the data packet, and then retransmits the data packet, still in broadcast mode. Conversely, the nodes that are neighbours of node N, but which do not belong to the MPR(N) set, read and process the data packets transmitted by node N, but do not retransmit them.

The SMF protocol also provides for an identification mechanism for duplicated data packets, such as, for example, the calculation of a hash function, or the introduction of a data packet sequence number in each data packet. In this way, given any node that is a multipoint relay, this cannot retransmit a data packet more than once, so as to avoid forming a loop.

More in particular, the SMF protocol furthermore envisages that the data packets can also be transmitted in multicast mode, or rather that it is possible to transmit data packets to a predetermined group of nodes. The multicast transmission of data packets is the same as the broadcast transmission of data packets, namely provides that the data packets are transmitted in broadcast mode and retransmitted only by the multipoint relays, but it also provides that if a node not belonging to the group receives a data packet, it then rejects the data packet without processing it.

In practice, also in the case of multicast transmission, the SMF protocol envisages an underlying broadcast transmission, the multicast transmission consequently being achieved through opportune programming of the protocol stacks of the nodes in the network.

The SMF protocol therefore enables distributing data packets in multicast mode; however, it is not optimized for this mode of operation.

Further examples of SMF and OLSR protocols are respectively disclosed in Macker J. et al., "Simplified Multicast Forwarding, rfc6621", Internet Engineering Task Force, Standard, Internet Society (ISOC) 4, Rue Des Falaises CH-1205, Geneva, Switzerland, 18 May 2012, pages 1-55 and Clausen T., "Combining Temporal and Spatial Partial Topology for MANET routing—Merging OLSR and FSR", Proceedings of IEEE Conference on Wireless Personal Multimedia Communications", 1 Oct. 2003, Yokosuka, Japan.

DISCLOSURE OF INVENTION

The object of the present invention is therefore to provide an SMF-type communication method, which at least partially solves the drawbacks of the known art.

According to the present invention, a communication method, a network node, a software product and a telecommunications network are provided, as respectively defined in the appended claims.

BRIEF DESCRIPTION OF THE DRAWINGS

For a better understanding of the invention, some embodiments will now be described, purely by way of non-limitative example and with reference to the attached drawings, where.

BEST MODE FOR CARRYING OUT THE INVENTION

This communication method is hereinafter described with reference, purely by way of example, to the mobile telecommunications network 1 shown in FIG. 1, which is a wireless packet network and includes a plurality of nodes 2, which are at least potentially mobile and communicate with each other by means of electromagnetic signals. Always by way of example, it is assumed that the nodes 2 are part of a multicast-type group 4 and that the mobile telecommunications network 1 also comprises a plurality of external nodes 6, which are not part of the group 4. Without any loss of generality, it is assumed that the nodes 2 and the external nodes 6 are all alike; the mobile telecommunications network 1 is therefore a peer-to-peer mesh-type MANET network.

For the purposes of this communication method, it is irrelevant how membership of the nodes 2 to group 4 has been determined and coded.

For example, the group 4 may be of the static type, in which case, the information regarding the membership of the nodes 2 to the group 4 and the information regarding the non-membership of the external nodes 6 to the group 4 may be preconfigured, in a manner which is in itself known, inside the nodes 2 and the external nodes 6.

Alternatively, the group 4 may be of the dynamic type, in which case, in a manner that is in itself known, the nodes may manage the group by the implementation, in the respective protocol stacks, of a protocol of the type, for example, such as the Internet Group Management Protocol (IGMP), described, for example, at Internet address https://datatracker.ietf.org/doc/rfc3376. In order to manage the group, it is also possible that a specific notification is introduced, in order to notify the start and end of participation of any node in the group 4.

For example, the entry of a node 2 in the group 4 may be notified by the same node 2 through the broadcast transmission of a corresponding control packet, which shall hereinafter be referred to as the entry packet.

The entry packet contains a group address that identifies the group 4, as well as a progressive sequence number, which is incremented by one unit on each transmission of an entry packet. In the case (not shown) where the mobile telecommunications network 1 contains more than one group, the entry packet contains the addresses that identify all the groups that the node enters, which are also referred to as group addresses.

On the basis of the entry packets received, each node keeps a group table up to date, in which it stores, for each group, the corresponding group address and the addresses of the member nodes. In particular, the updating of the group table may take place through the introduction, for each data item contained therein, of a validity timeout, with the deletion of the data upon expiration. Alternatively, it is possible that each node, when it leaves a group, transmits a corresponding exit packet, through which it notifies the other nodes of it leaving the group.

For greater clarity, hereinafter the nodes 2 are also referred to as group nodes 2. In addition, special reference is made to a source node S, which, purely by way of example, belongs to the group 4. In addition, reference is made to first and second relay node R1 and R2, which are neighbours of the source node S and are multipoint relays of the source node S, as well as a first and second block nodes B1 and B2, which are both two hops away from the source node S and are neighbours, respectively, of the first and second relay nodes R1 and R2. More in particular, the first relay node R1 and the first and second block nodes B1 and B2 do not belong to the group 4, while the second relay node R2 belongs to the group 4; furthermore, the first block node B1 is a multipoint relay of the first relay node R1, while the second block node B2 is a multipoint relay of the second relay node R2.

Without any loss of generality, it is also assumed that the nodes perform this communication method on the Internet Protocol (IP) layer, and that therefore the traffic, i.e. the control packets and data packets, are of the IP type. In this case, when a node generates (and consequently transmits) a packet, it inserts its IP address, as well as its address related to a lower layer, such as its address in the Media access control (MAC) Ethernet address format for example. Furthermore, when a generic node retransmits a packet, it does not change the IP address of the packet, which indicates the node from which the packet originated, but inserts its own MAC address, replacing the previously stored MAC address. Therefore, except where specified otherwise, and without any loss of generality, it is assumed that the addresses mentioned hereinafter are IP addresses.

That having been said, assuming that the source node S generates a data packet addressed to the group 4, i.e. addressed to all the other group nodes 2, it transmits the data packet so that the data packet is received and processed by all the neighbouring nodes of the source node S. The data packet generated by the source node S contains the group address of the group 4.

Given any other node of the mobile telecommunications network 1 that i) receives the data packet transmitted by the source node S and is a multipoint relay of the source node S, or that ii) receives a data packet transmitted by a mode different from the source node S to retransmit the data packet generated by the source node S, and is a multipoint relay of this different node, and referring to this other node as the receiving node, this receiving node performs the following operations, in order to determine whether or not to retransmit the data packet received. Before describing these operations, hereinafter reference is made to multicast packet to indicate, indifferently, the data packet transmitted by the source node S and addressed to the group 4, or a data packet equal, with regard to the data content, to the data packet transmitted from the source node S, but transmitted by a different node from the source node S, in order to retransmit the data packet generated by the source node S. Furthermore, generic reference is made to the sending node to indicate the node that has transmitted or retransmitted the multicast packet to the receiving node; the sending node is a neighbour of the receiving node. Hereinafter, except where specified otherwise, it is also intended that the receiving node is a multipoint relay of the sending node.

Figure 2:
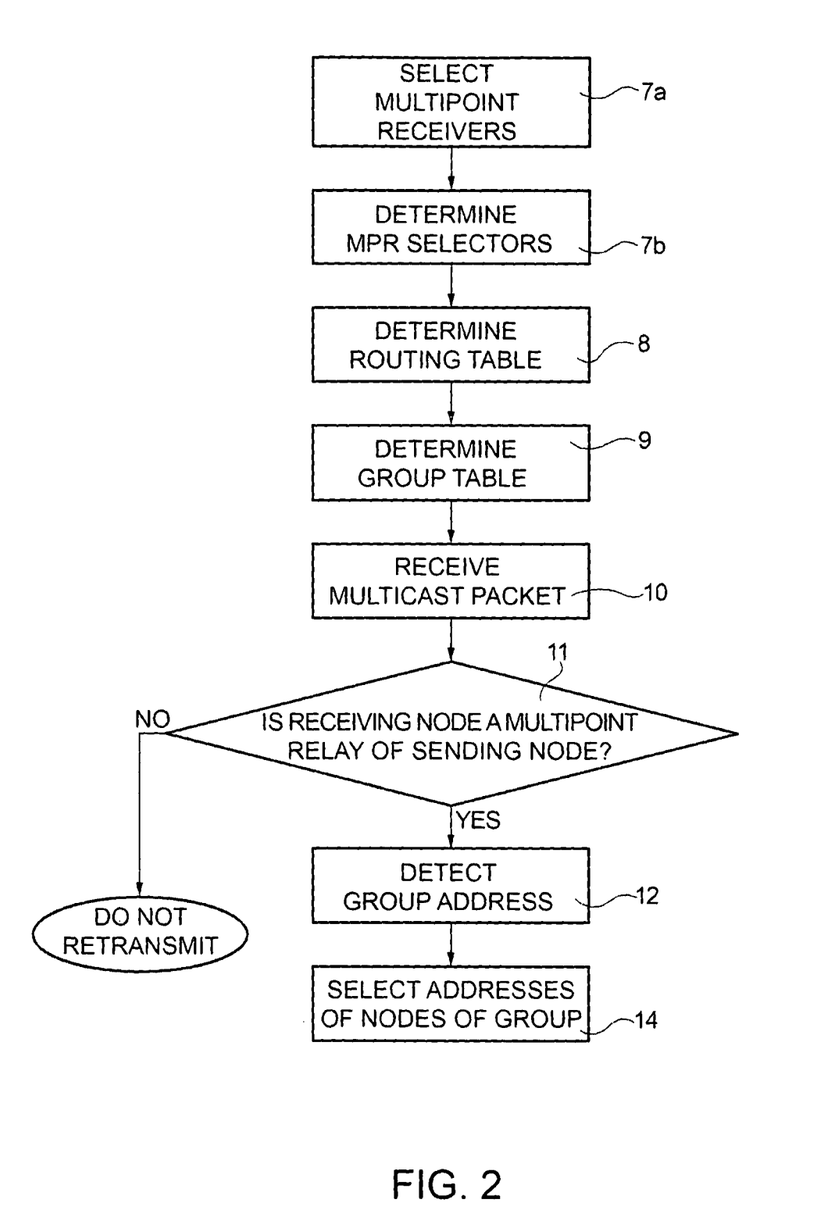
FIGS. 2-5 show flowcharts of the operations performed by the nodes of the network shown in FIG. 1.

That having been said, according to a first embodiment shown in FIG. 2, and as previously mentioned, the receiving node is configured, in a manner which is in itself known, to select (block 7a) its multipoint repeaters and the determine (block 7b) its MPR selectors, as well as to determine (block 8), in a manner that is in itself known, its own routing table. In addition, the receiving node is configured to determine (block 9) its group table, i.e. to determine, for each group, the corresponding group address and the addresses of the member nodes.

Following the reception (block 10) of the multicast packet, transmitted or retransmitted from the sending node, the receiving node checks (block 11) if it is a multipoint relay of the sending node, i.e. if the sending node is an MPR selector of the receiving node; in addition, although not shown, the receiving node checks that the packet received is effectively a data packet potentially to be retransmitted, and is not, for example, a HELLO packet.

In the case where the receiving node is not a multipoint relay of the sending node (NO exit from block 11), it does not retransmit the multicast packet.

Otherwise, if the receiving node is a multipoint relay of the sending node (TES exit from block 11), the receiving node detects (block 12) the group address contained in the multicast packet and performs the operations described hereinafter. In this example, the receiving node detects the group address that identifies the group 4.

In detail, the receiving node selects (block 14) each of the (node) addresses contained in the entry of its group table with a group address equal to the detected group address, the latter being equal, in this example, to the group address that identifies the group 4. Hereinafter, these addresses, contained in the group table, are referred to as the addresses of the nodes of the group. It should also be noted that in FIG. 2, as also in the following figures, the operations are shown, for simplicity of representation, in sequence, although some operations or parts of them may be carried out in in an order at least partially different from that shown; in other words, the flowcharts shown in FIG. 2 and in the successive figures are purely qualitative.

Figure 3:
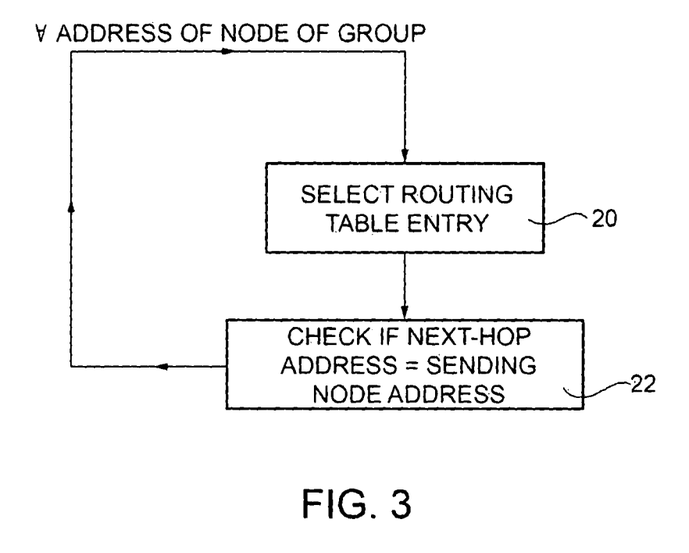

As shown in FIG. 3, given a first address selected from the addresses of the nodes of the group, the receiving node selects (block 20) the entry in its routing table with a destination address equal to this selected first address, and then checks (block 22) if the next-hop address of the selected entry is equal to the address of the sending node, in which case the receiving node selects a successive address from the aforementioned addresses of the nodes of the group and repeats the operations in blocks 20 and 22.

Figure 4:
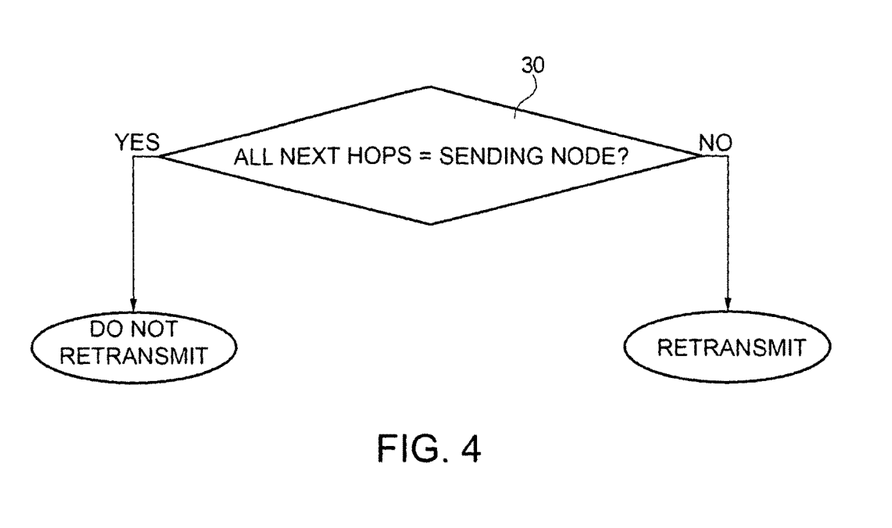

In practice, given an address selected from the addresses of the nodes of the group and indicating the node whose address is stored as the next-hop address in the entry in the routing table with the destination address equal to the given selected address as the corresponding next hop, the receiving node checks (block 30, FIG. 4) a first block condition, i.e. it checks if all the next hops corresponding to the addresses of the nodes of the group are equal to the address of the sending node. If this is true (YES exit from block 30), the receiving node does not retransmit the multicast packet, otherwise (NO exit from block 30) the receiving node retransmits the multicast packet, so that it still contains the group address of the group 4.

Figure 1:
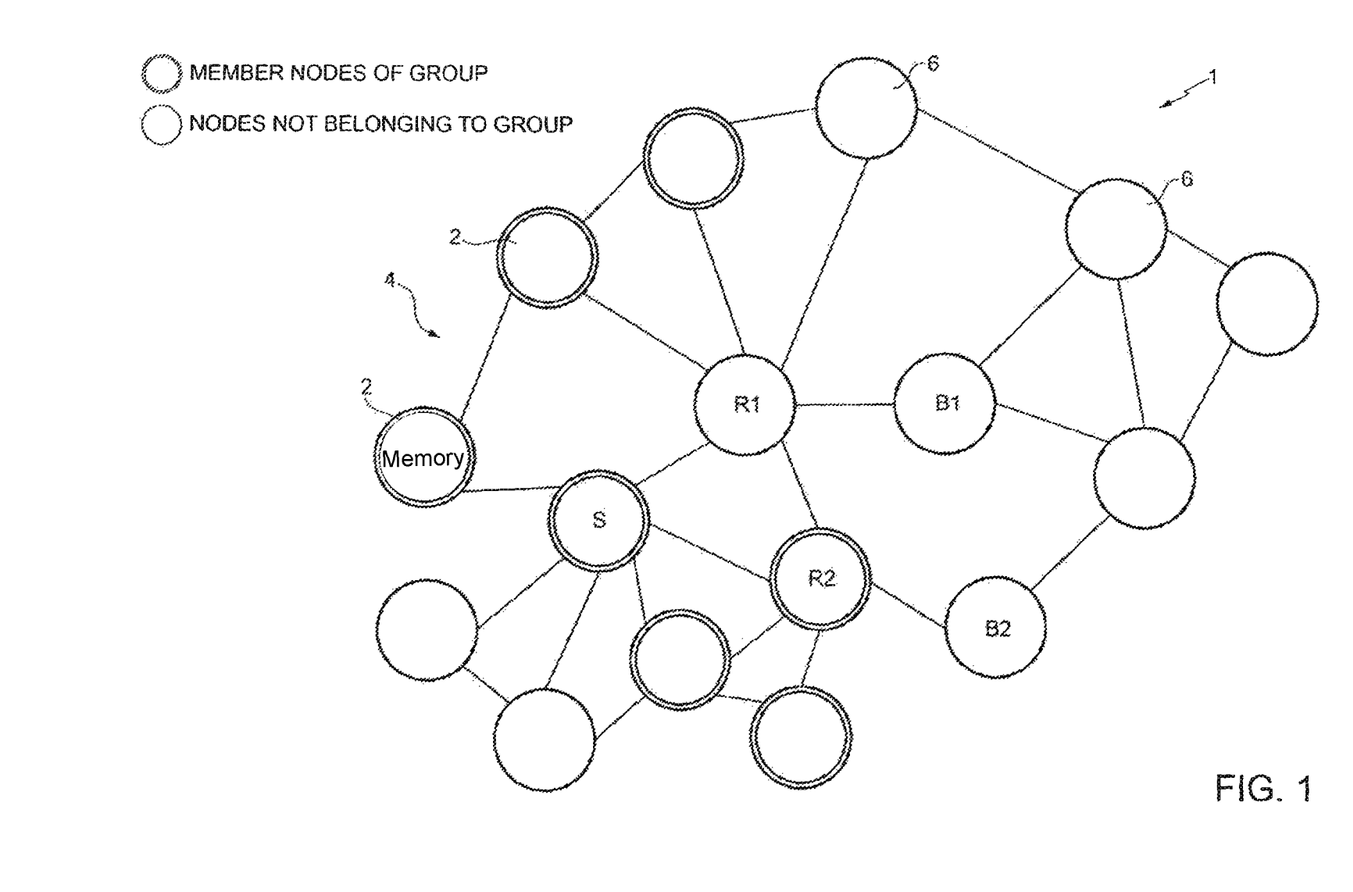
FIG. 1 schematically shows a telecommunications network including a plurality of nodes.

With specific reference to the example shown in FIG. 1, if the receiving node is one of the first and second relay nodes R1 and R2, it retransmits the multicast packet, in the same way as happens in the SMF protocol. Instead, if the receiving node is one of the first and second block nodes B1 and B2, it does not retransmit the multicast packet. In fact, if the receiving node is alternatively equal to the first or the second block node B1 or B2, it has a routing table such that the next-hop address of all the entries related to destinations that belong to the group 4 is equal, respectively, to the address of the first, or the second relay node R1 or R2; in both cases, the next-hop address thus corresponds to the node from which the receiving node has received the multicast packet. In this way, the pointless retransmission of multicast packet to areas of the mobile telecommunications network 1 not forming part of the group 4 is prevented.

According to a different embodiment, described hereinafter and still making reference, purely by way of example, to the source node S, the information contained in its routing table can be used in order to further optimize the multicast flow.

Figure 5:
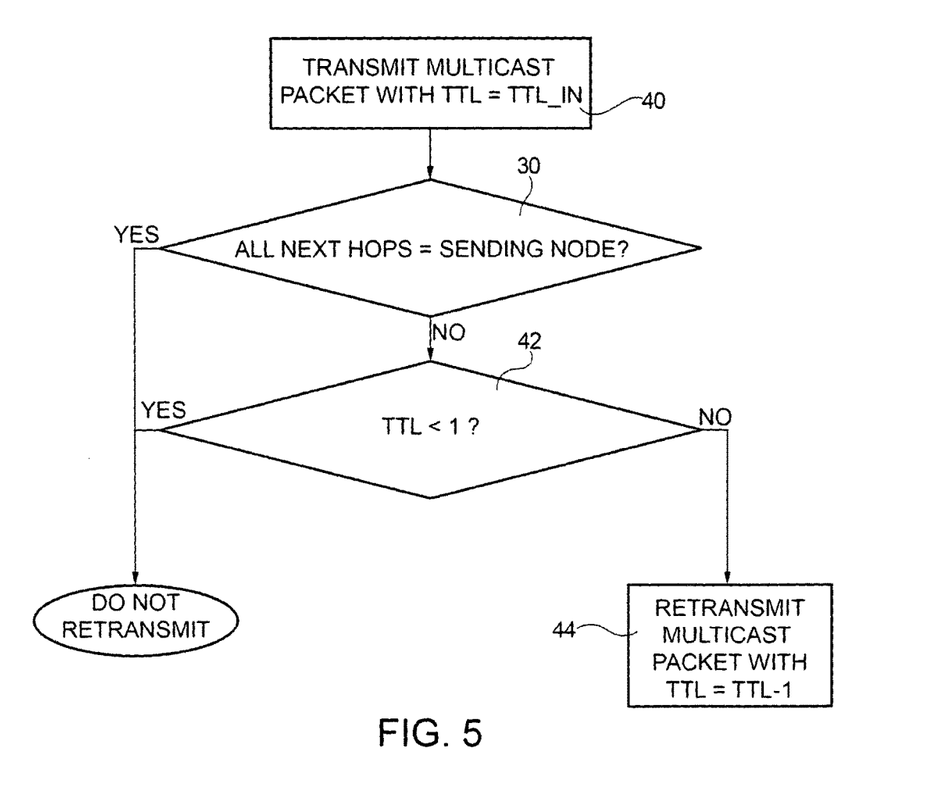

As shown in FIG. 5, the source node S generates (block 40) the multicast packet and then transmits the multicast packet, so that it contains a time-to-live (TTL) field, in which a TTL counter is present. In particular, the source node S initially sets the TTL counter equal to an initial value TTL_IN, of integer type for example.

When the receiving node receives the multicast packet, if the first block condition is not respected (NO exit from block 30), the receiving node checks (block 42) if a second block condition is respected, this being that the TTL counter contained in the received multicast packet is less than one, i.e. zero. If the TTL counter contained in the received multicast packet is less than one (YES exit from block 42), the receiving node does not retransmit the multicast packet; otherwise (NO exit from block 42), the receiving node, which is a multipoint relay of the sending node, retransmits (block 44) the multicast packet, after having decremented the TTL counter by one unit. It should be noted that, for simplicity of representation, in FIG. 5 the operations performed before block 30 are no longer shown, apart from the aforementioned operations in block 40.

It follows that, if at least one of the first and second block conditions is respected, the receiving node does not retransmit the multicast packet, i.e. it blocks retransmission. Furthermore, on each successive retransmission of the multicast packet, the value of the TTL counter drops by one unit. When the aforementioned receiving node receives a multicast packet containing a TTL counter equal to zero, it does not retransmit the multicast packet, independently of respecting the first block condition.

From a different viewpoint, and with reference, for simplicity, to the mobile telecommunications network 1 shown in FIG. 1, the receiving node checks if a retransmission condition is respected, this comprising:

i) the fact that at least one address exists among the addresses of the nodes of the group 4 (stored in the group table of the receiving node) whereby the entry of the routing table of the receiving node that includes a destination node address equal to this at least one address contains a next-hop node address that belongs to a different node from the sending node; and ii) the fact that the TTL counter contained in the multicast packet transmitted by the sending node is greater or equal to a limit value, the latter being, for example, equal to one.

Furthermore, the receiving node retransmits the multicast packet only if the aforementioned retransmission condition holds.

In still greater detail, the source node S chooses the initial value TTL_IN so as to enable reception of the multicast packet by the group node 2 furthest from the source node S. To this end, given a maximum possible distance dmax between any group node 2 and the source node S, this distance being intended as a number of hops, the source node S sets the initial value TTL_IN such that the relation TTL_IN≥dmax is true. For example, the relation TTL_IN=dmax+1 may be applied, in order to ensure a safety margin and enable reaching even a possible group node that has moved away during the diffusion of the multicast packet due to high mobility.

With reference to the example shown in FIG. 1, each group node 2 is more than two hops away from the source node S, and so the relation TTL_IN≥2 holds.

The advantages that can be achieved with this communication method clearly emerge from the foregoing description. In particular, this communication method implements a routing protocol of the "mesh based" type. Therefore, this communication method enables limiting the diffusion of a multicast flow in areas of the network where there are not any nodes belonging to the group, without resorting to a tree distribution, which in itself is susceptible to topological changes in the network. Conversely, this communication method contemplates making use of local metrics, exploiting information already present within the nodes, in order to enable the multipoint relays to decide whether or not to relay multicast traffic.

In practice, for the retransmission of the data packets, this communication method contemplates using subsystems of multipoint relays and, in particular, multipoint relays positioned around unicast paths placed between the source node and possible destination nodes.

Finally, it is clear that modifications and variants can be made to this communication method, without departing from the scope of the present invention, as defined in the appended claims.

For example, the information contained in the tables and in the entries mentioned in the description, as well as inside the control packets, may be organized differently with respect to that described; in addition, part of this information may be absent. The actual formats in which the addresses are stored may vary from node to node and/or table to table, without this implying any breakdown in the correspondence between each node and the address that identifies it.

Furthermore, in general and as previously mentioned, the described operations may be carried out in a different order with respect to that described; purely by way of example, it is possible that the checks in blocks 42 and 30 are performed in reverse order with respect to that shown in FIG. 5, and therefore that the check in block 30 and the associated operations are only performed if the TTL counter contained in the received multicast packet is greater or equal to one. Furthermore, some of the operations shown in a sequence may be performed substantially at the same time. In addition, some operations are repeated over time.

As previously mentioned, there may also be numerous groups in the mobile telecommunications network 1.

Furthermore, within each group, the transmission of the data packets takes place according to the standard SMF protocol, and so, as previously mentioned, known types of techniques may be adopted for detecting duplicated data packets, in order to avoid pointless retransmissions and the formation of loops.

It is also possible that the communication method is implemented, for example, entirely at the MAC layer, without resorting to upper layers.

It is similarly possible that the multicast packet is not a data packet, but a control packet, for example.

In addition, although this can cause an increase in traffic, it is possible that, given any node, all of its neighbouring nodes are multipoint relays of this node, in which case the receiving node does not perform the checks in block 11.

Finally, this communication method can also be adopted in the case where the nodes are fixed and the network is therefore not of the mobile type.

The invention claimed is:

1. A communication method of the Simple Multicast Forwarding (SMF) type for a network including a plurality of nodes, which form at least one multicast group, said method comprising the steps, performed by a first node, of:
   determining, among the neighbouring nodes, a respective set of multipoint relays;
   determining, among the neighbouring nodes, the nodes for which the first node is a respective multipoint relay;
   determining a respective routing table, formed by a plurality of entries, each entry comprising an identifier of a corresponding destination node and an identifier of a next-hop node, said next-hop node neighbouring the first node and being a multipoint relay of the first node, and the destination node being connected to the first node through the next-hop node;
said method further comprising the steps, performed by the first node, of:
   determining a set of identifiers of the nodes that belong to the multicast group; and
   receiving a multicast packet sent by a sending node neighbouring the first node, and containing a counter;
said method further comprising, if the first node is a multipoint relay of the sending node, performing, by the first node, a step of checking:
   if at least one node identifier belonging to the multicast group exists for which the routing table entry of the first node that includes a destination node identifier corresponding to said at least one identifier contains a next-hop node identifier corresponding to the identifier of a node different from the sending node; and
   if the counter contained in the received multicast packet respects a predetermined mathematical relation with a limit value;
said method further comprising, if the first node is a multipoint relay of the sending node, determining, by the first node, whether to perform a step of retransmitting the multicast packet, based on the outcome of said checking step; said method being characterized in that it further comprises the step of retransmitting the multicast packet, if the execution of the retransmitting step has been determined, said retransmitting step comprising retransmitting the multicast packet by the first node such that the value of the counter contained in the retransmitted multicast packet is different from the value of the counter contained in the received multicast packet.

2. The communication method according to claim 1, further comprising the step of generating, by a source node (S), the multicast packet such that the counter of the generated multicast packet is equal to an initial value that is a function of the maximum distance between said source node and any of the nodes of the multicast group.

3. The communication method according to claim 1, further comprising the step of checking, by the first node, whether it is a multipoint relay of the sending node.

4. A node for a network including a plurality of nodes, which form at least one multicast group, said node being configured to implement a communication method of the Simple Multicast Forwarding (SMF) type and comprising:
   among the neighbouring nodes of said node, a set of multipoint relays;
   selecting, among the neighbouring nodes, the nodes for which the node is a respective multipoint relay;
   determining a routing table, formed by a plurality of entries, each entry comprising an identifier of a corresponding destination node and an identifier of a next-hop node, said next-hop node neighbouring the node and being a multipoint relay of the node, and the destination node being connected to the node through the next-hop node;
   determining a set of identifiers of the nodes that belong to the multicast group;
   receiving a multicast packet sent by a sending node neighbouring said node and containing a counter;
   a checking, if said node is a multipoint relay of the sending node, whether:
      at least one identifier of a node belonging to the multicast group exists for which the routing table entry of said node that includes a destination node identifier corresponding to said at least one identifier contains a next-hop node identifier that corresponds to the identifier of a node different from the sending node; and
      the counter contained in the received multicast packet respects a predetermined mathematical relation with a limit value; and
   determining whether to perform the retransmission of the multicast packet, based on the outcome of the checking performed by the checking unit; said node being configured to retransmit said multicast packet, if the execution of the retransmitting step has been determined, such that the value of the counter contained in the retransmitted multicast packet is different from the value of the counter contained in the received multicast packet.

5. The node according to claim 4, further comprising a generator configured to generate a new multicast packet such that it contains a respective counter equal to an initial value, which is a function of the maximum distance between said node and any of the nodes of the multicast group.

6. The node according to claim 4, further comprising checking whether said node is a multipoint relay of the sending node.

7. A software product that loaded in a memory of a node comprising hardware in a telecommunications network that implements, when executed using said hardware, the communication method according to claim 1.

8. A telecommunications network comprising a plurality of nodes according to claim 4.

* * * * *